US006278573B1

(12) United States Patent
Uwabo et al.

(10) Patent No.: US 6,278,573 B1
(45) Date of Patent: Aug. 21, 2001

(54) FLOPPY DISK DRIVE HAVING DUSTPROOF STRUCTURE FOR HIGH CAPACITY FLOPPY DISK

(75) Inventors: Tsuneo Uwabo, Hachiouji; Yoshihiro Okano; Eiichi Yoneyama, both of Atsugi; Yoshinori Tangi, Hachiouji, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/232,313

(22) Filed: Jan. 15, 1999

(30) Foreign Application Priority Data

Jan. 16, 1998 (JP) .................................................. 10-006421

(51) Int. Cl.[7] .................................................. G11B 33/14
(52) U.S. Cl. ...................................................... 360/97.02
(58) Field of Search ............................... 360/97.01–99.12

(56) References Cited

U.S. PATENT DOCUMENTS 5,898,537 * 4/1999 Oizumi .............................. 360/97.01
6,091,572 * 7/2000 Cox .................................... 360/99.08

* cited by examiner

Primary Examiner—A. J. Heinz
(74) Attorney, Agent, or Firm—Frishauf, Holtz, Goodman, Langer & Chick, P.C.

(57) ABSTRACT

In a floppy disk drive for writing/reading information to/from a floppy disk having a magnetic recording medium of a high memory capacity, a bottom plate of a driver casing defining a floppy disk containing space has a plurality of exhaust ports for expelling dust outside therethrough adjacent a front end opening for loading and unloading the floppy disk to the floppy disk containing space. The driver casing further has sealing elements for closing cable holes formed in the bottom plate and other gaps for blocking air flows from outside into the floppy disk containing space through the cable holes and gaps.

12 Claims, 11 Drawing Sheets

FLOPPY DISK DRIVE HAVING DUSTPROOF STRUCTURE FOR HIGH CAPACITY FLOPPY DISK

BACKGROUND OF THE INVENTION

The present invention relates to a floppy disk drive device or a disk drive, particularly to a disk drive for driving a FD (Floppy Disk) having a recording medium of a high memory density or a high memory capacity.

In the prior art, a conventional floppy disk drive is used for magnetically writing and reading information to/from a floppy disk. Such a disk drive comprises a casing or housing having a bottom plate and a front opening and defining an inner room or a floppy disk containing space. The floppy disk is loaded and unloaded into the inner room through the front opening. The information is magnetically written/read to/from the floppy disk by a magnetic writing/reading assembly and a drive unit both disposed in the inner room.

A conventional floppy disk comprises an outer container having a shuttered window and the magnetic recording medium contained therein. For reading/writing information to the floppy disk, the magnetic recording medium is partially exposed in the shuttered window of the outer container by opening the shutter and is brought into contact with a magnetic head of the magnetic writing/reading assembly.

In order to avoid unfortunate invasion of dust into the outer container through the opened window of the outer container to contaminate the magnetic recording medium, the floppy disk is provided with a liner and a lifter disposed in the outer container. The liner is pressed onto a surface of the magnetic recording medium by the lifter to prevent dust from contaminate the surface of the magnetic recording medium.

Recently, a new floppy disk has been proposed and become used which has a magnetic recording medium having a memory capacity higher than the conventional floppy disk.

The magnetic recording medium of the conventional or ordinary floppy disk usually has a conventional or ordinary memory capacity of 1–2 Mega bytes and that of the new floppy disk has a memory capacity, of about 128 Mega bytes or more, higher than the ordinary memory capacity. The floppy disk having the ordinary memory capacity and that having the higher memory capacity will be referred to as a ordinary floppy disk and a high capacity floppy disk, respectively, hereinafter.

The high capacity floppy disk is driven at a rotation speed higher than the ordinary floppy disk for magnetically writing and reading information. Therefore, with the high capacity floppy disk, it is desired not to use the lifter that's used in the case of the ordinary floppy disk. This is because the use of the lifter requires the increased torque for a driving motor of drive unit which drives the high capacity floppy disk at the high speed.

In addition, if dust or small rubbish invades into the outer container, it is difficult to remove and is readily adhered the surface of the magnetic medium and therefore the magnetic head, resulting in a problem where it is difficult to write and read information to/from the high capacity floppy disk.

SUMMARY OF THE INVENTION

It is an object of the present invention to provide a disk drive for a high capacity floppy disk which can avoid dust from invading into the floppy disk without use of a lifter during the operation for driving the floppy disk.

It is another object of the present invention to provide a disk drive for use in writing and reading to/from a high capacity floppy disk which is capable of preventing invasion of dust from outside into the disk drive.

The present invention is applicable to a disk drive for a floppy disk of a high memory capacity, the floppy disk comprising an outer container and a recording medium of a high memory capacity contained therein. According to the present invention, the disk drive comprises: a housing defining an inner room therein and having a front end opening connecting with the inner room for allowing the floppy disk to be loaded into and unloaded from the inner room therethrough. The housing has a bottom plate defining a bottom of the inner room. The bottom plate has a front end portion formed with ventilation holes for allowing air to pass therethrough from the inner room to the underside of the bottom plate. The bottom plate further has a through-hole through which an electric cable extends between the inner room and the underside of the bottom plate. An printed circuit board is mounted on the housing but under the bottom plate and connected witht he electric cable. A drive unit is mounted to the bottom plate and has a driving portion disposed in the inner room on the bottom plate for operatively connecting with and driving the floppy disk loaded into the inner room. A read/write head assembly is disposed in the inner room to be able to operatively engage with the recording medium for reading/writing data into and from the recording medium. A closure element is disposed to close the through-hole for blocking air flow through the through-hole but allowing the electric cable to extend through the through-hole.

Further, the present invention can provide a disk drive device for reading/writing information into a floppy disk having a magnetic recording medium of a high memory capacity. The disk drive device comprises: a casing defining a floppy disk containing space and having a front end opening for allowing the floppy disk to be loaded into and unloaded from the floppy disk containing space therethrough. The casing has at least one exhaust port adjacent the front end opening for expelling dust or small rubbish outside. The casing further has gaps for causing air flows therethrough. A magnetic writing/reading assembly is disposed in the floppy disk containing space for writing and reading information to/from the magnetic recording medium of the floppy disk loaded in the floppy disk containing space. Sealing elements are mounted to the casing to close the gaps for blocking the air flows through the gaps.

DESCRIPTION OF THE PREFERRED EMBODIMENTS

Prior to description of preferred embodiments of the present invention, a disk drive known i the prior art will be explained with reference to FIGS. 1 and 2, in order to facilitate the better understanding of the present invention.

Figure 1:
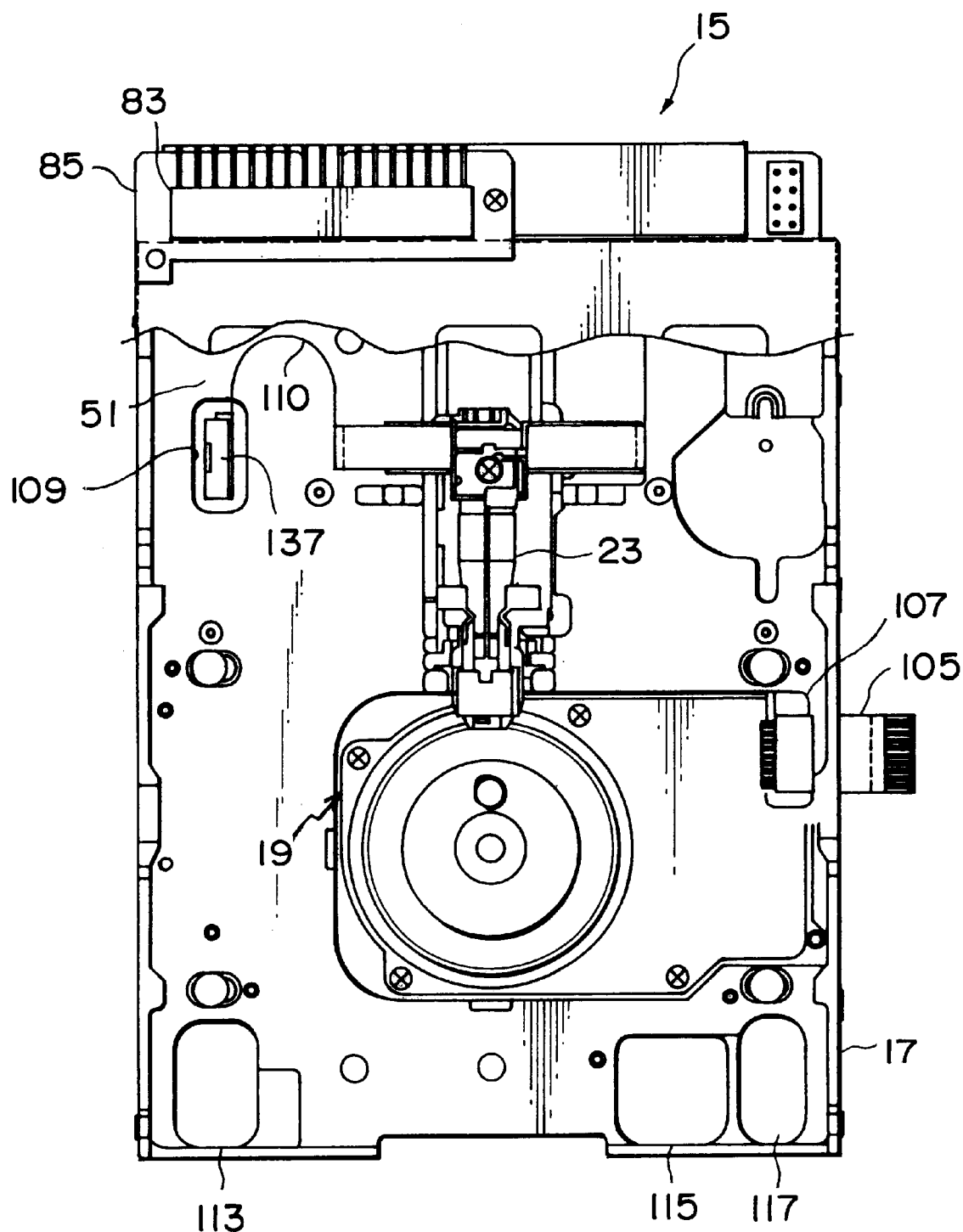
FIG. 1 is a plan view illustrating important portions of a disk drive used for a ordinary floppy disk in the prior art.
Figure 2:
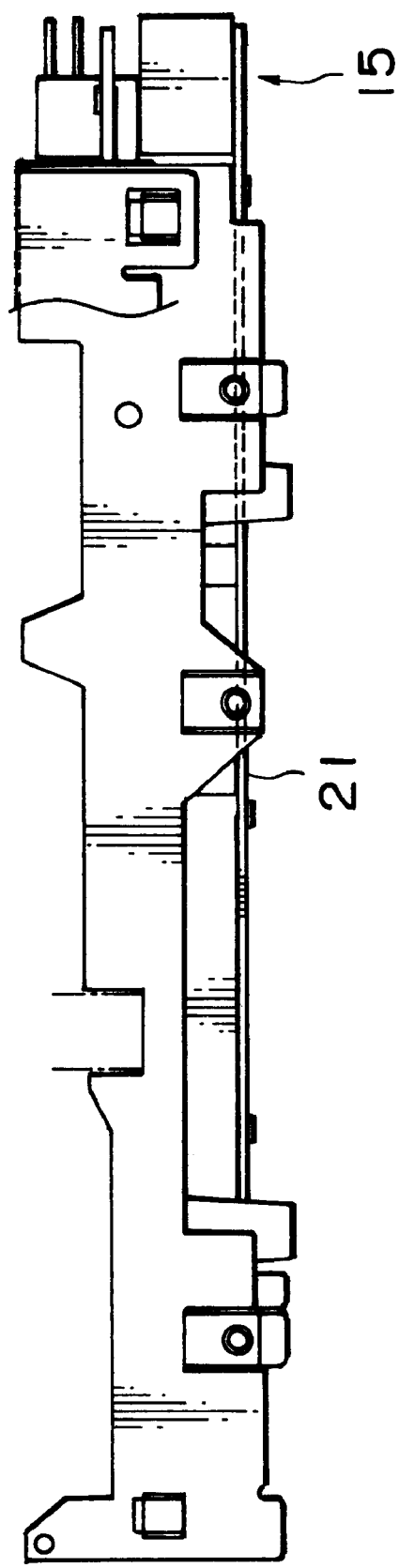
FIG. 2 is a side view illustrating important portions of the disk drive of FIG. 1.

Referring to FIGS. 1 and 2, the known disk drive shown therein has a disk drive main body 15 covered with a cover (not shown). The disk drive main body 15 has a frame unit 17 which forms a casing or housing together with the cover fitted onto the frame unit 17. The casing defines an inner room or a floppy disk containing space therein. The disk drive main body 15 has a front bezel (not shown) mounted on a front end of the frame unit 17. The frame unit 17 and the front bezel have openings communicated with each other to form a front end opening of the housing. The front end opening is used for loading and unloading the ordinary floppy disk in the inner room.

The disk drive main body 15 is provided with a drive unit 19 for rotating the floppy disk loaded in the inner room. The drive unit 19 is mounted on the bottom plate 51 at an intermediate portion thereof adjacent the front end opening and includes a spindle motor and a driving portion. The driving portion is disposed in the inner room and is operatively engages and drives the floppy disk loaded therein. A magnetic read/write assembly or a carriage assembly 23 is disposed in the inner room for writing and reading information for the floppy disk loaded in the inner space. The carriage assembly 23 has at least one magnetic head disposed at a rear portion of the bottom plate 51 rear from the intermediate portion and is operatively engageable with a magnetic recording medium in the floppy disk loaded. A main printed circuit board 21 is fixed to the frame unit 17 and is disposed under the bottom plate 51.

The bottom plate 51 is formed with through-holes 113, 115, and 117 in the front end portion and through-holes 107 and 109 in opposite side portions of the intermediate portion and the rear portion, respectively. The through-holes 113, 115 and 117 serve as ventilation ports or exhaust ports for allowing air flows to pass therethrough together with dust. In detail, those through-holes 113, 115 and 117 serve as ducts for expelling airflow caused by driving operation of the driving unit and rotation of the magnetic recording medium of the floppy disk thereby. Therefore, air blows out of the disk containing space through the through-holes. Thus, dust may flow out of the inner room.

The through-holes 107 and 109 are provided for leading out electric cables 105 and 110 from the drive unit 19 and the carriage assembly 23 to the outside of the housing and to a connector 137 on the main printed circuit board 21, respectively.

The housing has a rear end wall with a rear opening. That is, the frame unit has a corresponding rear wall portion with a rear slot in which a connector support board is mounted. The connector support board comprises a small printed circuit board 85 and an electric connector 83 mounted on the small printed circuit board for connecting with an external circuit.

When the cover is fitted onto the frame unit 17 to form the housing, the rear opening is formed. However, there is left gaps between the connector support board 83–85 and the surrounding edge of the rear opening.

Furthermore, the cover is made of a sheet of metal plate by pressing, punching, and bending the metal plate into a shape of box. Therefore, a clearance is inevitable made at boundary or corner portions between rear and side faces.

The through-holes 107 and 109, the gaps between the rear opening edge and the connector support board 83–85, and any other clearances of the housing allow air flows therethrough into the inner room. Thus, dust could be taken into the inner room together with the air flows. The dust taken in would adhere to the magnetic recording medium in the floppy disk which is partially exposed to be engaged with the magnetic head, although some of the dust could be led out through the exhaust ports 113, 115 and 117.

Therefore, there is the problem as described in the Background of the Invention in use of the above described conventional disk drive for driving the high capacity floppy disk.

Now, embodiments of the present invention will be described in detail below with reference to FIGS. 3–12.

Figure 3:
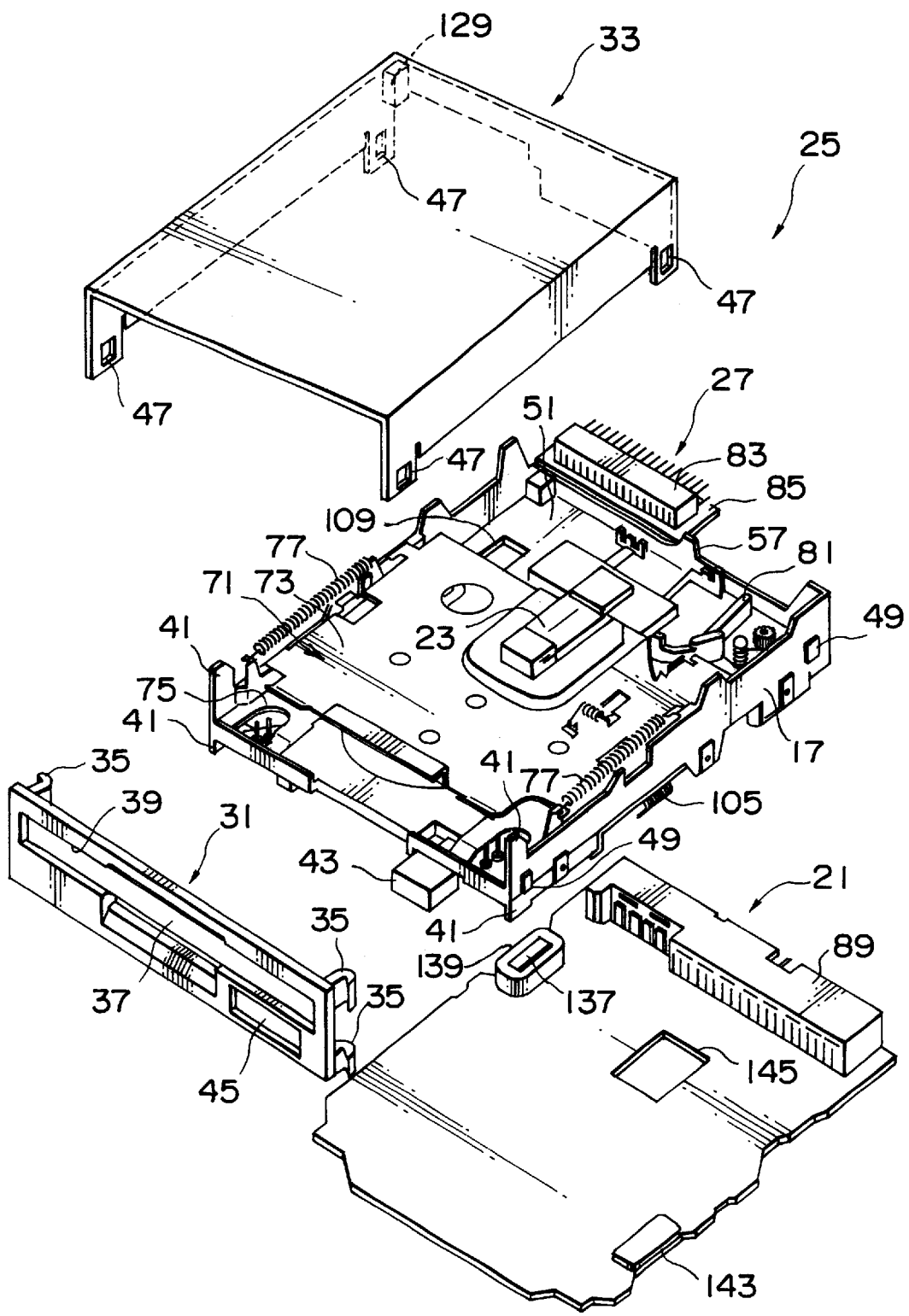
FIG. 3 is an exploded perspective view illustrating an example of a disk drive used for a high capacity floppy disk according to the present invention.

Referring to FIG. 3, reference numeral 25 represents a disk drive for writing and reading information for a high capacity floppy disk according to an embodiment of the present invention, which will be referred to as "a high capacity disk drive".

Referring to FIGS. 3–7, the high capacity disk drive 25 also comprises a disk drive main body 27 which is similar to the disk drive main body 15 of the known disk drive shown in FIG. 1. Generally, the disk drive main body 27 comprises a frame unit 17 having a bottom plate 51, a main printed circuit board 21, a front section or bezel 31 having a front end opening 39, a drive unit 19, and a carriage assembly 23, in the structure similar to the known disk drive main body 15. The bottom plate 51 is formed with holes 113, 115, and 117 for exhaust ports and through-holes 107 and 109 for passing electric cables therethrough in the similar manner as in that of the known disk drive.

A cover 33 is fitted to the frame unit 17 to cover over the disk drive main body 27 and forms a housing or a casing which has an inner room or a floppy disk containing space therein between the cover 33 and the frame unit 17. The cover 33 has opposite side walls each of which is formed with two engaging holes 47, a total of four engaging holes. When the cover 33 is attached to the disk drive main body 27, the four engaging holes 47 may be engaged with four projections 49 formed on the four corners of the frame unit 17, respectively. The cover 33 is formed from a sheet of metal plate by pressing, punching, and bending.

The front section 31 has four engaging claw members 35 and an opening 39 of the front section 31 (on the front side) which is covered with a door 37 behind the opening 39. The four engaging claw members 35 are adapted to engage four engaging members 41 vertically projecting on front upper and front lower sides of the frame unit 17, thereby insuring to secure the front section 31 to the frame unit 17.

In fact, the opening 39 is a front end opening of the housing and serves to load and unload the floppy disk into and from the inner room or the floppy disk containing space in the housing. When a floppy disk is inserted through the opening 39 into the inner room, the door 37 is opened by being pivoted rearward about its upper side. Moreover, the front section 31 has an opening 45 adapted to attach an ejection button 43 provided at the disk drive main body 27.

Referring to FIGS. 4–7, the frame unit 17 comprises the bottom plate 15, two side plates 53 and 55, a rear end plate 57. The bottom plate 51 has a recess portion 59. The drive unit 19 is fixedly disposed within the recess portion 59 by means of a motor board 61 and screws 63.

The drive unit 19 has a driving portion or a disk table 67 which rotates a magnetic recording medium of the high capacity floppy disk loaded in the inner room, a rotor 69, a motor (not shown), an the motor board 61. The disk table 67 has a rotating shaft 65 at the enter thereof. The rotor 69 is positioned surrounding the disk table 67 for supporting a table.

The motor on the motor board 61 is connected with a flat cable 105 which extends through the through-hole 107 to the underside of the bottom plate 51 and is then led out of the housing to be electrically connected with any external circuit. The through-hole 107 is closed by a sealing or closing element 143 for blocking air flow through the through-hole 107, according to the present invention. Therefore, any dust is prevented from introduced into the floppy disk containing space through the through-hole 107.

Provided to the rear of the bottom plate 51 is a carriage assembly 23 of the magnetic head which engages with a surface of the magnetic recording medium of the high capacity floppy disk for performing the magnetic recording of a high density. The carriage assembly 23 is connected to the main printed circuit board 21 by a flat cable 110 extending through the through-hole 109. The flat cable 110 is connected to the carriage assembly 23 at an end and is connected at the opposite end to a connector 137 mounted on the main printed circuit board 21. The through-hole 109 is also closed by a sealing or closing element 139 for blocking air flow through the through-hole 109, according to the present invention. Therefore, any dust is prevented from introduced into the floppy disk containing space through the through-hole 109.

Figure 4:
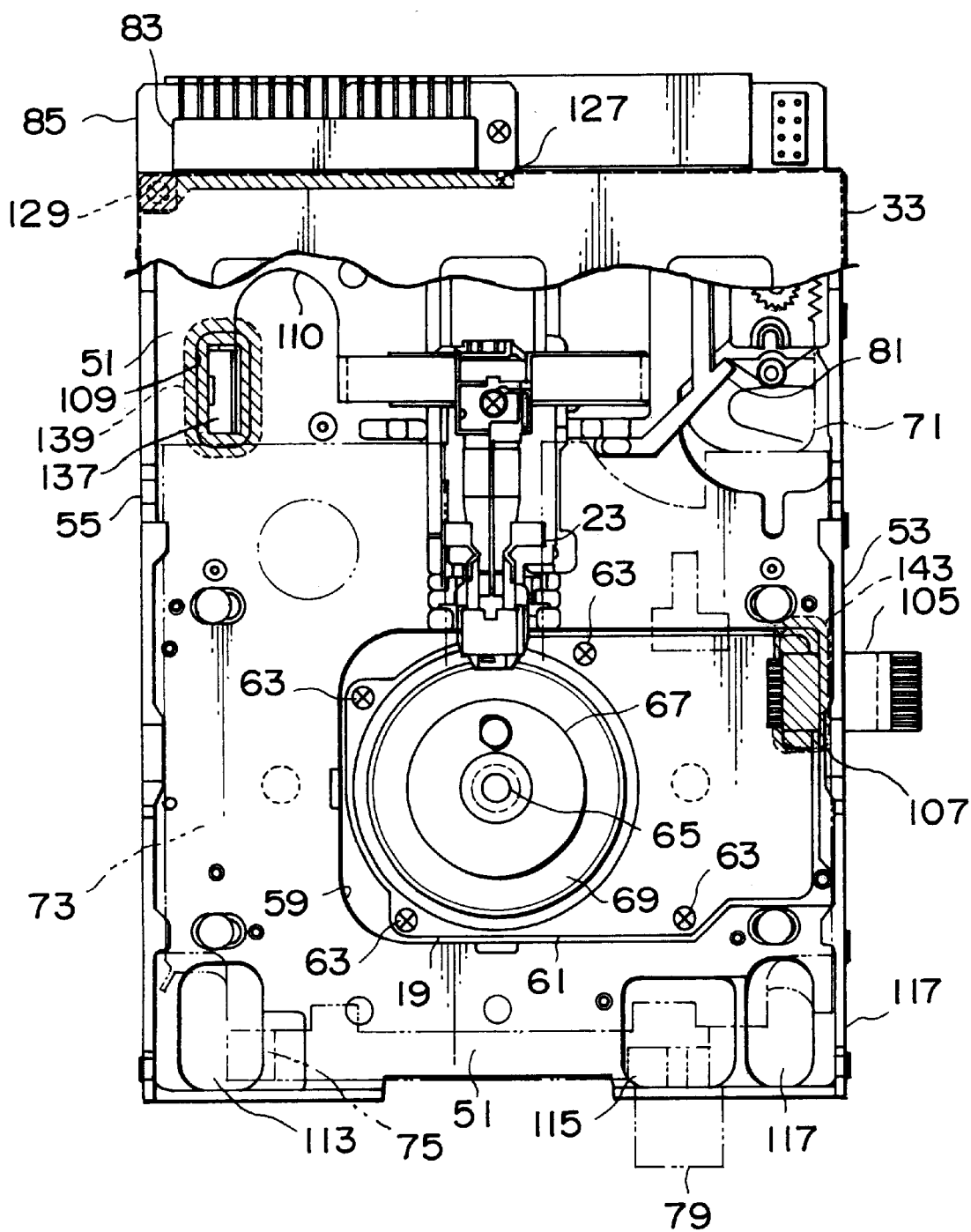
FIG. 4 is a plan view illustrating important portions of the disk drive of FIG. 3.
Figure 5:
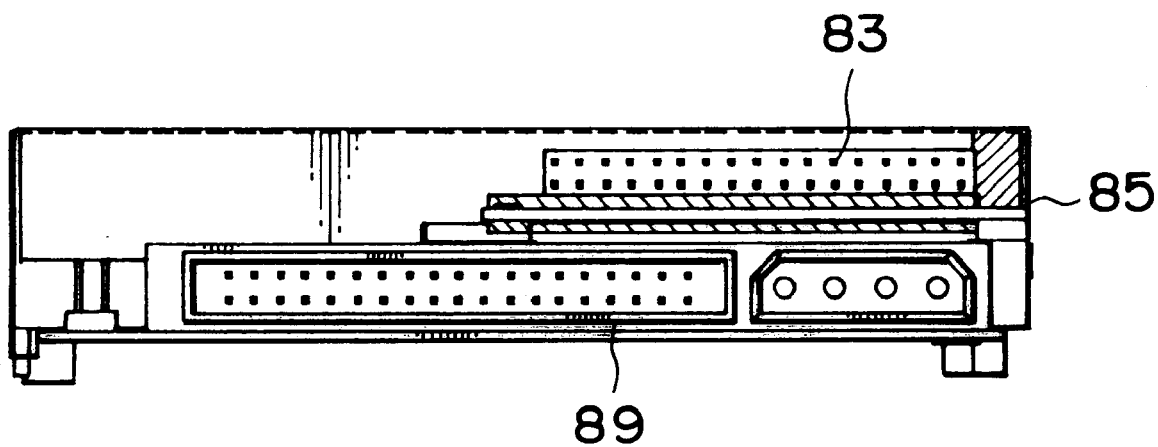
FIG. 5 is a rear view illustrating important portions of the disk drive of FIG. 3.

The disk drive main body 27 is provided a disk holder unit 71 on the bottom plate 51 as indicated by a two-dot chain line in FIG. 4. The disk holder unit 71 comprises a holder 73 for guiding and holding the floppy disk loaded into the inner room and an ejection plate 75 for ejecting the floppy disk from the disk holder unit 71. The ejection plate 75 is driven by operation of the ejection button 43. Further, a coil-shaped spring 77 is provided to urge the holder 73 in its closing and opening direction during ejecting and inserting operations, respectively.

Behind the disk holder unit 71 on the bottom plate 51, an ejection lever 81 is provided which is interlocked with the ejection button 43 and the ejection plate 75.

A connector support board is mounted on the rear end plate 57 and comprises a small printed circuit board 85 and a connector 83 mounted thereon in the similar manner as in the known disk drive shown in FIGS. 1 and 2.

Figure 6:
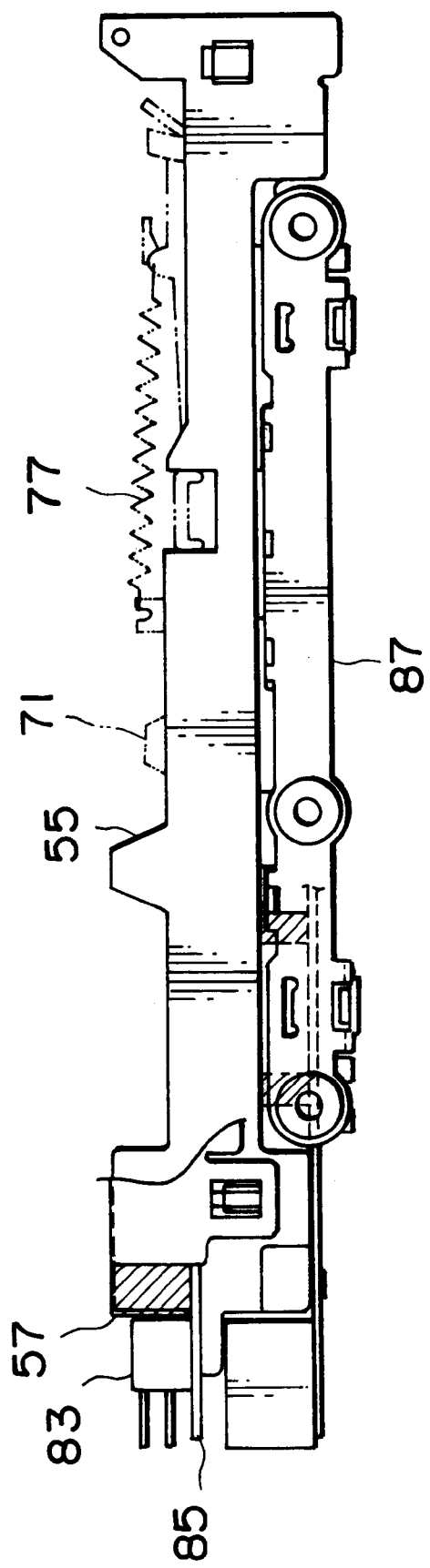
FIG. 6 is a right side view illustrating important portions of the disk drive of FIG. 3.

In addition, as can be best seen from FIG. 6, a lower plate 87 is provided under the side plate 55 of the frame unit 17. Such lower plate 87 is used to fix the disk drive in an accommodation apparatus other than the disk drive.

Figure 7:
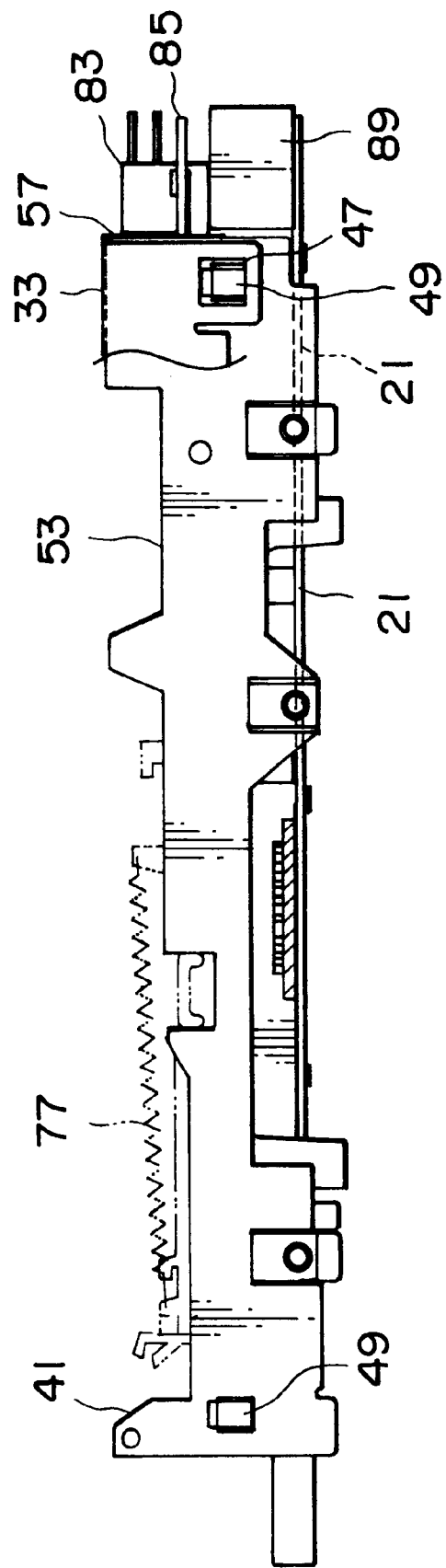
FIG. 7 is a left side view illustrating important portions of the disk drive of FIG. 3.

Moreover, as can be best understood from FIG. 7, a connector 89 is provided on the main printed circuit board 21.

Figure 8:
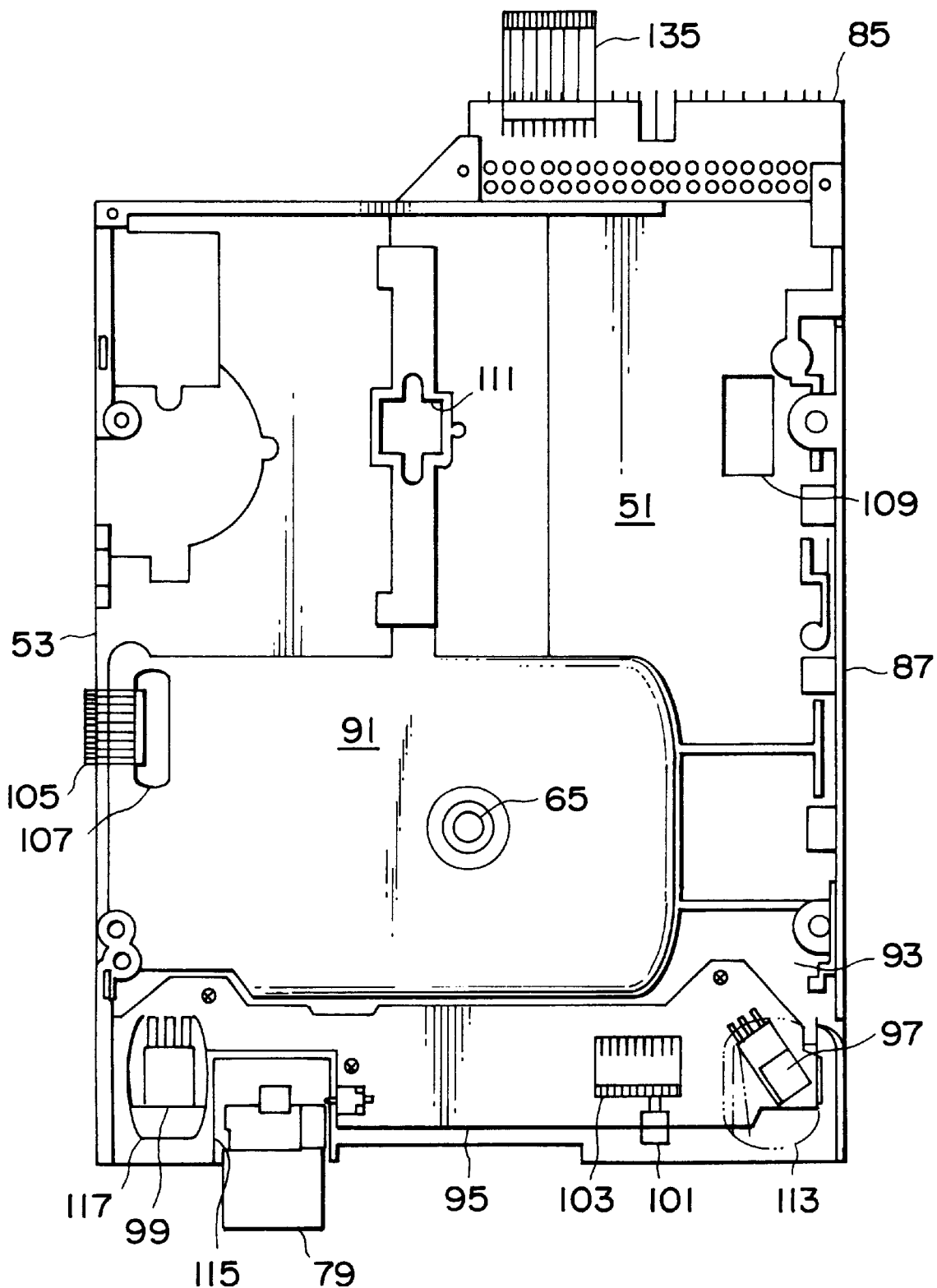
FIG. 8 is a bottom view illustrating the main body of the disk drive of FIG. 3.

FIG. 8 is a bottom view indicating the bottom condition of the frame unit 17. As shown in FIG. 8, the main printed circuit board 21 is omitted for the purpose of a clear illustration.

Referring again to FIG. 8, on the rear end surface of the bottom plate 51 is formed a recess portion 93 which is closer to the front, downwards in the figure, than the projection 91 corresponding to the recess portion 59. A sub-board 95 is provided on the recess portion 93. The sub-board 95 is useful for performing a desired attachment and detachment of a medium cartridge (floppy outer container). Some electronic elements 97, 99, 101 and one end of the flat cable 103 are attached onto the sub-board 95.

As seen in FIG. 8, the bottom plate 51 is further formed with a through-hole 111 which is used to dispose the carriage assembly 23 at its position together with a hole 145 formed in the main printed circuit board 21. Therefore, the through-hole 111 is closed by the carriage assembly 23 supported on the bottom plate 51 together with the main printed circuit board 21.

Figure 9:
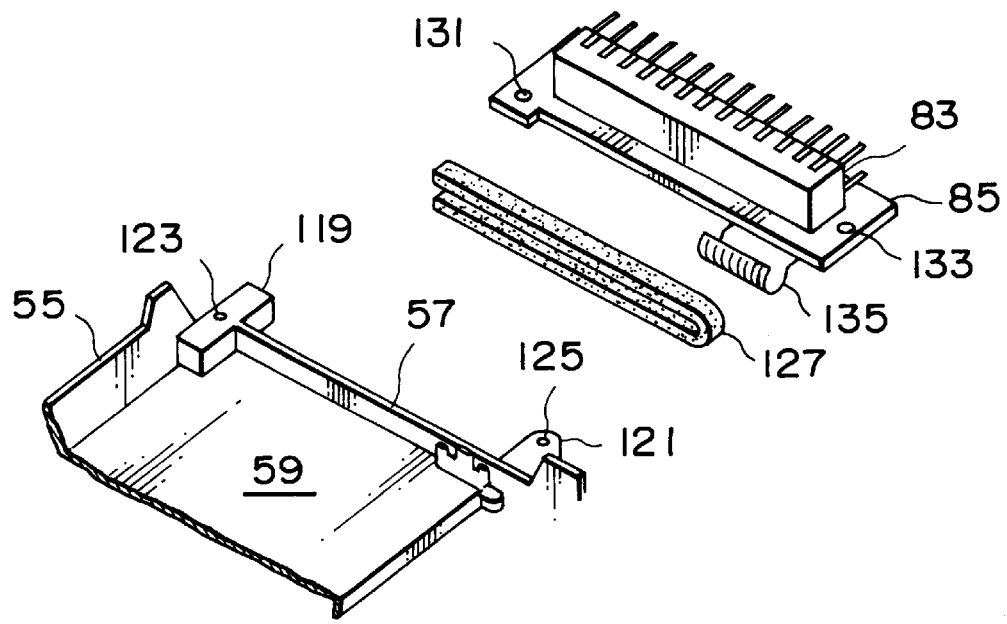
FIG. 9 is an exploded perspective view illustrating a first dustproof structure for use in the disk drive of FIG. 3.

Referring to FIG. 9, the connector support board 83–85 is attached into the slot formed in the rear end plate 57 of the frame unit 17 by the use of screws (not shown) which are engaged in holes 123 and 125 formed in attaching portions 119 and 121 projecting rearward of the rear end plate 57. In FIG. 9, reference numerals 131 and 133 are used to represent screw holes formed in the small printed circuit board 85, while a reference numeral 135 can be used to represent a flat cable connected to the connector 83.

Figure 10:
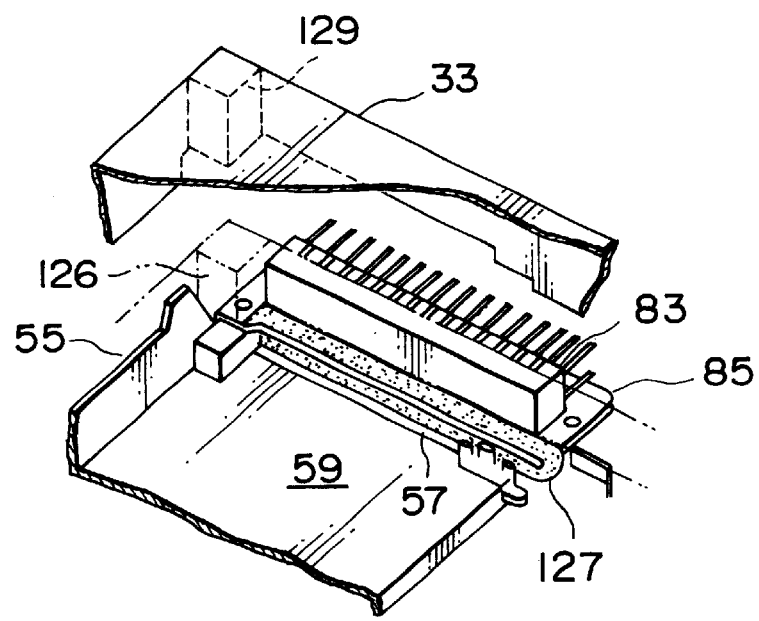
FIG. 10 is an exploded perspective view illustrating the first and the second dustproof structures for use in the disk drive or FIG. 3.

However, when the cover 33 is closed as shown in FIG. 10, undesired clearances 126 will be formed between the connector support board 83–85 and the cover 33. In order to seal up such clearances 126, an elongated U-shaped sealing member 27 made of a high molecular material like a sponge or two elongated rod-like sealing members (not shown) are provided as a sealing portion on the connector board 85. Further, a prismatic sealing member 129 made of a high molecular material like a sponge is used to seal at corners of the cover 33. In this way, it is possible to completely seal up these clearances in a manner as shown in FIG. 10. Therefore, dust is prevented from introduction into the inner room of the housing through the clearances.

As has been described above, the bottom plate 51 of the frame unit 17 has through-holes 107, 109, 111, 113, 115, and 117. However, the through-holes 107 and 109 are closed by sealing elements 143 and 139, respectively so that no dust is introduced into the inner room through the through-holes 107 and 109. Another through-hole 111 is also closed by supporting the carriage assembly 23 on the bottom plate 51. The other through-holes 113, 115 and 117 are used as the exhaust ports for exhausting any dust together with air blows flowing out of the inner room therethrough. Although the through-hole 115 may be closed by the ejection button 43 and/or the ejection plate 75, any other possible problems can be avoided because the through-hole 115 is far from the carriage assembly 23 and because through-holes 113 and 117 serve as the exhaust ports.

Figure 11:
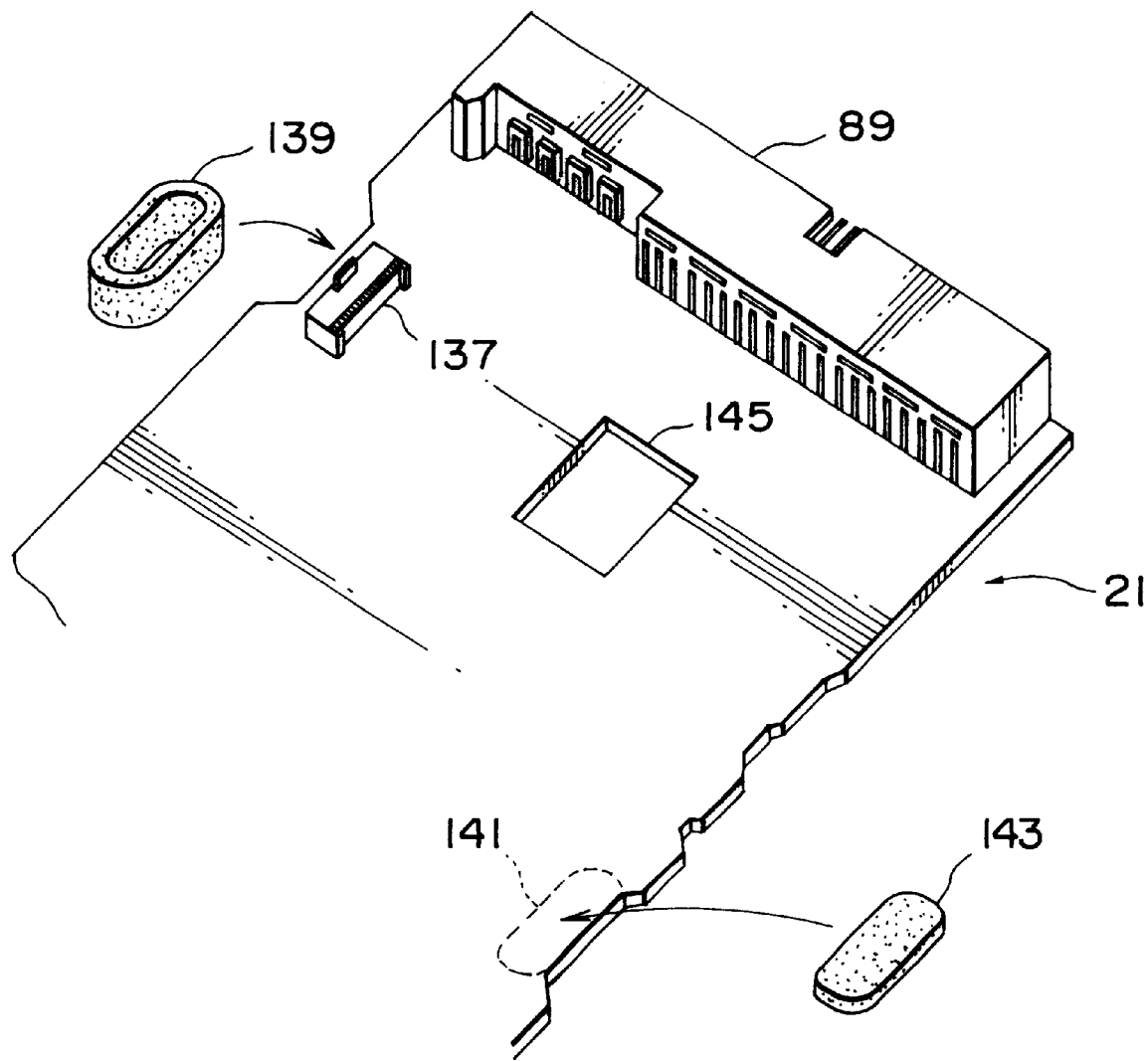
FIG. 11 is an exploded perspective view illustrating a third and a fourth dustproof structures for use in the disk drive of FIG. 3.
Figure 12:
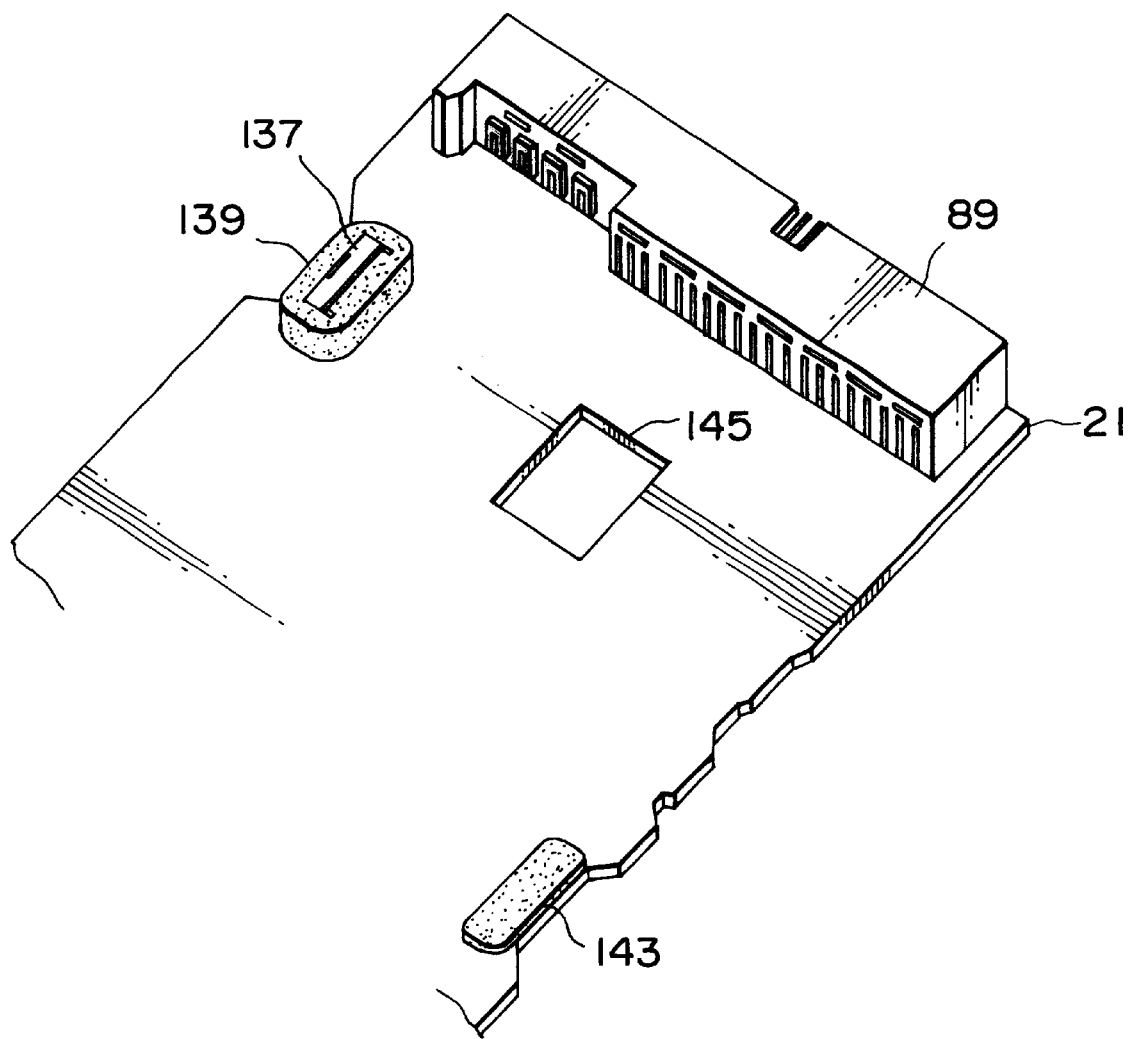
FIG. 12 is a perspective view illustrating a main printed circuit board with sealing elements of the third and the fourth dustproof structures are mounted thereon.

Referring to FIGS. 11 and 12, a track-like sealing member 139 made of a high molecular material like a sponge is attached as a sealing portion surrounding the connector 137 mounted on the surface of the main printed circuit board 21. Further, an elliptic sealing member 143 made of a high molecular material like a sponge is bonded to a portion indicated by a broken line on the surface of the main printed circuit board 21 in FIG. 11. Those sealing elements are preferably provided with adhering layers on one surface thereof by which the sealing elements can be readily adhered to the frame unit and other appropriate parts such as the connector. Referring once again to FIG. 3, when the main printed circuit board 21 mounting the sealing members 139 and 143 is to be fixed on to the frame unit 17, the sealing member 139 is caused to engage on the through-hole 109 shown in FIGS. 4 and 8 so as to seal a clearance between the hole 109 and a connector 139 but allowing the flat cable 110 to pass through the through-hole 109. On the other hand, the sealing member 143 is caused to engage (from above the flat cable) on the hole 107 shown in FIGS. 4 and 8 so as to seal a clearance between the hole 107 and the flat cable 105.

As described above, the disk drive for the high capacity floppy disk according to the present invention has been made to have dustproof structures, in which clearances are closed by sealing elements in the vicinity of the write/read head assembly to prevent airflow from entering through the clearances. Therefore, the write/read head assembly and the high capacity floppy disk are protected from outside dust and small rubbish.

Further, with the use of the present invention, it is also possible to expel the dust generated within the disk drive out of the exhaust ports provided at the front portion of the bottom plate by means of airflow caused by the rotation of the floppy disk.

Therefore, with the use of the above-described structure according to the present invention, it is possible to provide a high capacity disk drive that is capable of prohibiting a head crash, and that has an improved error rate during a process of data reading or data writing, and a prolonged usable life for both a magnetic recording medium and a magnetic head, when the disk drive uses a high capacity floppy disk which can not utilize a dust exhausting mechanism, such as a lifter or the like.

What is claimed is:

1. A disk drive for a floppy disk having a recording medium of a high memory capacity, said disk drive comprising:
   a housing defining an inner room therein and having a front end opening connecting with said inner room for allowing said floppy disk to be loaded into and unloaded from said inner room therethrough, wherein said housing comprises a bottom plate defining a base of said inner room, and said bottom plate comprises a front end portion formed with ventilation holes for allowing air to pass therethrough and exit said inner room such that dust and small rubbish are enable to be expelled from said inner room by means of air flow caused from rotation of said floppy disk, and wherein said bottom plate further comprises at least one through-hole through which an electric cable extends into said inner room;
   a printed circuit board mounted on said housing outside said bottom plate and connected with said electric cable;
   a drive unit mounted to said bottom plate and having a driving portion disposed in said inner room on said bottom plate for operatively connecting with and driving said floppy disk loaded into said inner room;
   a read/write head assembly disposed in said inner room and adapted to operatively engage with said recording medium of said floppy disk for reading/writing data into and from said recording medium; and
   at least one sealing element provided to close said at least one through-hole so as to block air flow through said through-hole while still allowing said electric cable to extend through said through-hole.

2. A disk drive as claimed in claim 1, wherein said housing comprises a rear end wall formed with a rear end opening, a connector support board is mounted in said rear end opening, said connector support board comprises a small printed circuit board and an electric connector mounted on said small printed circuit board for connecting with an external circuit, a gap is left between said rear end wall and said connector support board, and a further sealing element is disposed to close said gap for blocking air flow through said gap.

3. A disk drive as claimed in claim 1, wherein said bottom plate is formed with an aperture adjacent said drive unit, another electric cable extends into said inner room through said aperture, and another sealing element is disposed to close said aperture for blocking air flow through said aperture while still allowing said another electric cable to extend therethrough.

4. A disk drive device for a floppy disk having a magnetic recording medium of a high memory capacity, said disk drive device comprising:
   a casing defining a floppy disk containing space and having a front end opening for allowing said floppy disk to be loaded into and unloaded from said floppy disk containing space therethrough, said casing having at least one exhaust port adjacent said front end opening through which dust and small rubbish are enabled to be expelled by means of air flow caused from rotation of said floppy disk, and said casing further having gaps through which cables can be passed therethrough;
   a magnetic writing/reading assembly disposed in said floppy disk containing space for writing and reading information to/from said magnetic recording medium of said floppy disk when said floppy disk is loaded in said floppy disk containing space; and
   sealing elements mounted to said casing to close said gaps so as to block air flow through said gaps.

5. The disk drive device according to claim 4, wherein said casing comprises a frame unit having a circumferential side wall and a bottom plate connected thereto and a cover fitted onto said frame unit to define said floppy disk containing space therebetween, said bottom plate having a front end portion formed with said at least one exhaust port, and wherein said disk drive device further comprises:
   a main printed circuit board mounted to said bottom plate; and
   a drive unit mounted on said bottom plate at an intermediate portion of said bottom plate adjacent said front end portion for driving said floppy disk loaded in said floppy disk containing space;
   wherein said magnetic writing/reading assembly comprises a magnetic head disposed on said bottom plate at a rear portion thereof rearward from said intermediate portion;
   wherein said gaps in said casing comprise at least one through-hole in said bottom plate in a vicinity of said magnetic writings/reading assembly; and
   wherein at least one of said sealing elements projects from said main printed circuit board to close said at least one through-hole.

6. The disk drive device according to claim 5, wherein said at least one through-hole is provided for leading an electric cable to said floppy disk containing space.

7. The disk drive device as claimed in claim 4, wherein said casing comprises a rear end wall formed with a rear end opening, a connector support board is mounted in said rear end opening, said connector support board comprises a small printed circuit board and an electric connector mounted on said small printed circuit board for connecting with an external circuit, said gaps comprise clearances between said rear end wall and said connector support board, and said sealing elements are disposed to close said clearances so as to block air flow therethrough.

8. The disk drive device according to claim 4, wherein said sealing elements are made of high molecular material.

9. The disk drive device according to claim 8, wherein each of sealing elements has an adhesive layer on one surface thereof for adhering said sealing elements onto said casing.

10. The disk drive device according to claim 9, wherein said high molecular material has a sponge-like deformability.

11. The disk drive device according to claim 8, wherein said high molecular material is made of filler material.

12. The disk drive device according to claim 11, wherein said high molecular material has a sponge-like deformability.

* * * * *